United States Patent [19]
Martin

[11] Patent Number: 5,079,414
[45] Date of Patent: Jan. 7, 1992

[54] TRACKING TELESCOPE USING AN ATOMIC RESONANCE FILTER

[75] Inventor: Frederick Martin, Menlo Park, Calif.

[73] Assignee: GTE Government Systems Corporation, Stamford, Conn.

[21] Appl. No.: 594,771

[22] Filed: Oct. 9, 1990

[51] Int. Cl.$^5$ .............................................. G01J 1/20
[52] U.S. Cl. ................................ 250/203.3; 250/206.2; 356/141
[58] Field of Search ............... 250/203.3, 203.4, 203.6, 250/206.1, 206.2; 356/141, 152

[56] References Cited

U.S. PATENT DOCUMENTS

| | | | |
|---|---|---|---|
| 2,966,591 | 12/1960 | McCartney | 250/203.3 |
| 2,997,588 | 8/1961 | Wilcox, Jr. | 250/203.3 |
| 4,362,931 | 12/1982 | Maruko et al. | 250/203.4 |
| 4,829,597 | 5/1989 | Gelbwachs | 455/617 |
| 4,942,292 | 7/1990 | Ichimura et al. | 250/203.4 |

OTHER PUBLICATIONS

Jerry A. Gelbwachs, "Atomic Resonance Filters", *IEEE Journal of Quantum Electronics*, vol. 24, No. 7, Jul. 1988, pp. 1266–1277.

*Primary Examiner*—David C. Nelms
*Assistant Examiner*—Que T. Le

[57] ABSTRACT

A tracking system to enable a tracking telescope follow a light source, utilizes an atomic resonance filter positioned in close proximity to said telescope, and imaging optics positioned between the light source and the atomic resonance filter. The atomic resonance filter is positioned such that light signals from the light source pass through the imaging optics and are focused in a region within its interior. A plurality of optical sensors are positioned to detect re-emitted light signals from the atomic resonance filter. The optical sensors convert the detected re-emitted light signals to electrical signals proportional to the intensity of said re-emitted light signals. The telescope is repositioned by using these differences in electrical signals to equalize the re-emitted light signals detected by each of the optical sensors, thereby pointing the telescope directly at incoming light from the light source. Several configurations of the imaging optics, the atomic resonance filter and the optical sensors are possible.

3 Claims, 4 Drawing Sheets

TRACKING TELESCOPE USING AN ATOMIC RESONANCE FILTER

BACKGROUND OF THE INVENTION

This invention pertains generally to the field of tracking optical telescopes and, in particular, to the filters which select particular optical wavelengths to be tracked on. Specifically, it pertains to the use of an atomic resonance filter to serve this purpose.

Tracking optical telescopes are commonly used to track moving bodies which directly or reflectively emit optical radiation. Frequently, the optical tracker employs an optical filter which selects a particular optical wavelength to track on, rejecting the rest of the optical spectrum. Such an optical filter aids the effectiveness of the tracking telescope by rejecting background light and increasing the signal-to-noise ratio (SNR) of the optical tracking signal. The standard interference optical filters used for selecting a narrow band of optical wavelengths preserve the imaging properties of the telescope. Consequently, these optical filters preserve the incident angle of the optical signal, which manifests itself as a position in the focal plane of the imaging optics. A suitable segmented or multi-array sensor can detect the displacement of the incident angle and emit electrical signals proportional to this displacement. A commonly used electronic servosystem can use these electrical signals to reposition the telescope so that the optical image is centered on the optical signal. Hence, the use of such a sensor permits the telescope to effectively track incoming light signals.

Recently, the atomic resonance filter (ARF), comprised of vapors of specific atoms, has been developed, as a new type of narrow band optical filter. (Cf. "Atomic Resonance Filters", Jerry A. Gelbwachs, IEEE Journal of Quantum Electronics, Vol. 24, No. 7, July 1988, and U.S. Pat. No. 4,829,597). Typically, an incoming signal of a specific wavelength entering the atomic resonance filter elevates the atoms therein into an excited state, which state then deploys in a two-or multi-step cascade, emitting light at different wavelengths. A suitable sensor collects the light signals at the new wavelength. An appropriate arrangement of optical cutoff filters before and after the cell containing the vapors renders this device a very effective narrow band optical filter. Unfortunately, this class of atomic resonance filters loses the imaging properties of the filters and, consequently, atomic resonance filters do not function well in a tracking telescope.

SUMMARY OF THE INVENTION

It is a principal object of the invention to provide a tracking system for a tracking telescope utilizing an atomic resonance filter which overcomes the shortcomings of the prior art.

A tracking system to enable a tracking telescope follow a light source, comprises an atomic resonance filter positioned in close proximity to said telescope, and an optical imaging means positioned between the light source and the atomic resonance filter, in close proximity to said atomic resonance filter. The atomic resonance filter is positioned such that light signals from the light source pass through the optical imaging means and are focused in a region within said atomic resonance filter. A plurality of optical sensors are positioned to detect re-emitted light signals from the atomic resonance filter. The optical sensors convert the detected re-emitted light signals to electrical signals proportional to the intensity of said re-emitted light signals. The telescope is repositioned by using their differences in electrical signals to equalize the re-emitted light signals detected by each of the optical sensors, thereby pointing the telescope directly at incoming light from the light source.

In a second aspect of the invention, the atomic resonance filter is partitioned into quadrants, and there is one one optical sensor per quadrant.

In a third aspect of the invention, a tracking system to enable a tracking telescope follow a light source comprises an optical imaging means positioned between the light source and a fiber-optic bundle is positioned near the focal plane of the optical imaging means to collect the focused light from said optical imaging means. The fiber-optic bundle is subdivided into a plurality of sub-bundles and one atomic resonance filter is connected to each of the sub-bundles such that light signals from the light source passing through the optical imaging means and focused near the fiber-optic bundles are conveyed to each of the atomic resonance filters in proportion to the amount of light falling on the fiber-optic sub-bundles. At least one optical sensor is positioned after each of the atomic resonance filters to detect re-emitted light signals from the atomic resonance filters. The optical sensors convert the detected re-emitted light signals to electrical signals proportional to the intensity of the re-emitted light signals from the atomic resonance filters. The telescope is repositioned by using said electrical signals to equalize the re-emitted light signals detected by the optical sensors, thereby pointing the telescope directly at incoming light from the light source.

DESCRIPTION OF THE PREFERRED EMBODIMENTS

Figure 1:
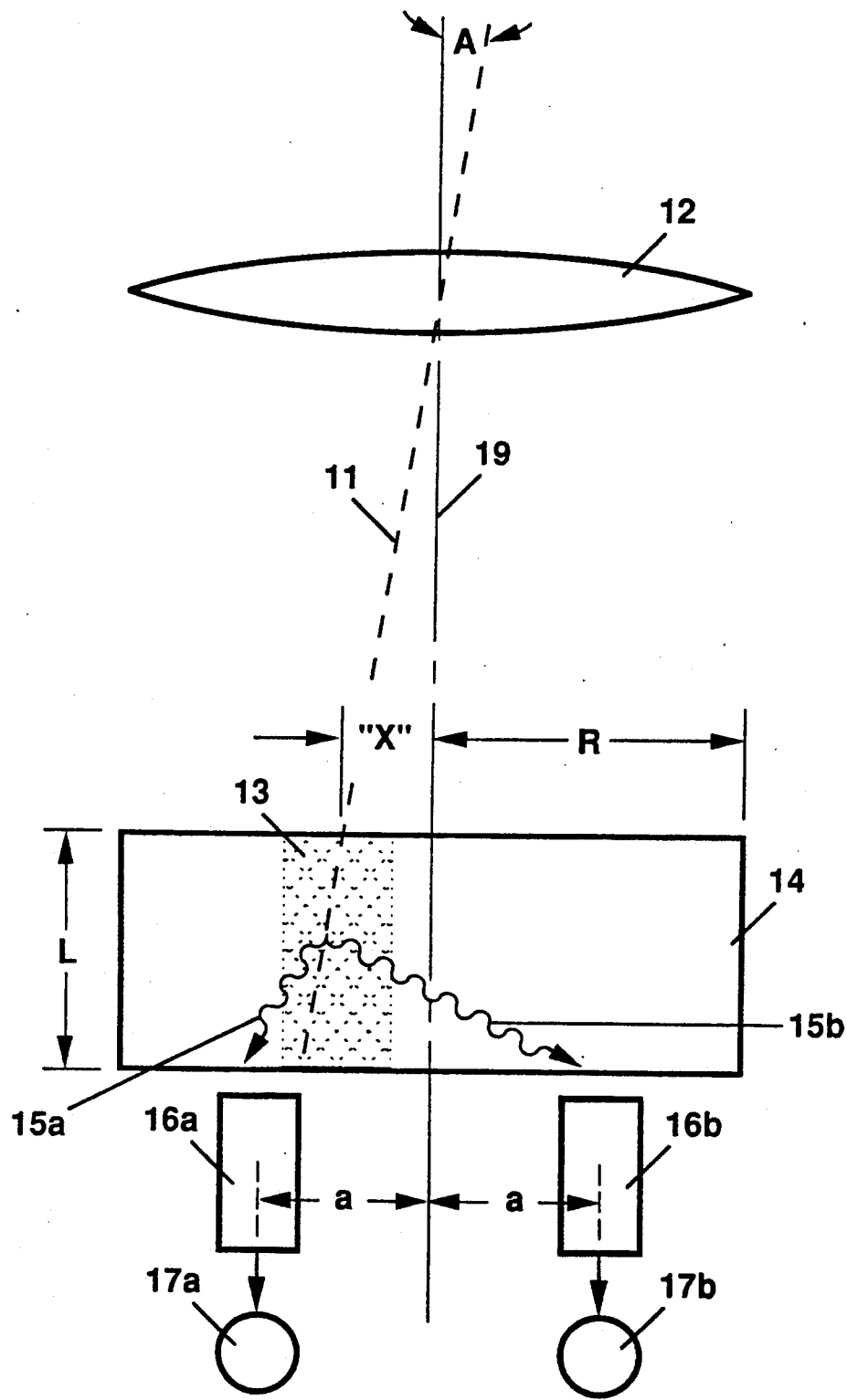
FIG. 1 is a schematic drawing of a first embodiment of an atomic resonance filter for use with a tracking telescope, according to the invention.

FIG. 1 is a schematic illustration of a first embodiment of an atomic resonance filter system for a tracking telescope. This embodiment relies on the short mean free path of the re-emitted light for its effectiveness. Referring to FIG. 1, incoming light 11 at an incident angle A passes through imaging optics 12, which can be any combination of lenses and mirrors positioned on the input side of an atomic resonance filter 14. Imaging optics 12 focus the incoming light signals 11 in a region 13 located inside an atomic resonance filter 14. Imaging optics 12 cause the displacement of region 13 at a distance X from the center line 19 of atomic resonance filter 14 to be proportional to angle of incidence A of the incoming light signal 11. When angle A is zero, displacement X is zero. Since the purpose of a trackign system for a tracking telescope is to rotate or reposition the telescope until the displacement X is zero, thereby pointing the telescope at the incoming light signals, this invention is directed to providing a correction for this displacement.

In region 13, all or most of the incoming light signals 11 are absorbed by the vapor inside atomic resonance filter 14. The vapors re-emit the light signals at new wavelengths 15a, 15b. Optical sensors 16a, 16b, positioned on the output side of atomic resonance filter 14 collect much of the re-emitted light signals, and in turn produce electrical signals 17a, 17b at their outputs. Optical sensors 16a, 16b are positioned on the output side of atomic resonance filter 14 to optimize the difference in the detected signals from the re-emitted light 15b, 15b. Because some of the re-emitted light is also absorbed by the vapors within atomic resonance filter cell 14, the amount of re-emitted light reaching the optical sensors 16a, 16b is proportional to the path length of the re-emitted light 15a, 15b travelling from region 13 to sensors 16a, 16b. The longer the path length of light signals 15a, 15b, the weaker the signals are in sensors 16a, 16b, respectively. If the optical light signals 11 are displaced in atomic resonance filter 14, there will be a difference in the path lengths of re-emitted light 15a, 15b, and consequently a difference in the electrical signals 17a, 17b outputted by sensors 16a, 16b. The servoelectronics of a tracking telescope system, according to this invention, use this difference in the detected signals 17a, 17b to reposition the telescope to equalize the light signals detected by each optical sensor, and thereby point the tracking telescope at the incoming light. Such servo systems are known in the art (Cf. G. J. Thaler, "Design of Feedback Systems," Dowden, Hutchinson & Ross, 1973).

Since the differential signals 17a, 17b result from the physical properties of the vapors used in atomic resonance filter, the relative signal strengths of the detected signals 17a, 17b can be estimated from the properties of the vapors in atomic resonance filter 14. As a representative example, assume that: (1) the entering light is blue and the re-emitted light is red; (2) the blue light is absorbed approximately uniformly over region 13; and (3) the red light 15a, 15b is strongly absorbed over the path length between region 13 and sensors 16a, 16b. This is shown in the following formulation:

$$\langle \rho \rangle = \frac{\rho_x \epsilon^{-\rho_x \lambda} - \rho_n \epsilon^{-\rho_n \lambda}}{\epsilon^{-\rho_x \lambda} - \epsilon^{-\rho_n \lambda}};$$

where:
$\rho_x$ = the maximum path length from region 13 to a specific sensor;
$\rho_n$ = minimum path length from region 13 to a specific sensor;
$\langle \rho \rangle$ = the weighted means path length for the re-emitted light 15a or 15b from the region 13 to either sensor 16a or 16b, respectively; and
$\lambda$ = the mean free absorbtion path for the re-emitted light.

From this it follows that the signals in the two optical sensors 16a, 16b are:

$$S_a \alpha \epsilon^{-\lambda \langle \rho a \rangle}; S_b \alpha \epsilon^{-\lambda \langle \rho b \rangle}.$$

The difference in the signals for the two optical sensors 16a, 16b is:

$$\Delta = \frac{S_a - S_b}{S_a + S_b} = \frac{\epsilon^{-\lambda \langle \rho a \rangle} - \epsilon^{-\lambda \langle \rho b \rangle}}{\epsilon^{-\lambda \langle \rho a \rangle} + \epsilon^{-\lambda \langle \rho b \rangle}}$$

Referring to FIG. 1, a typical cell of atomic resonance filter 14 may have the following dimensions: L=3 inches; a=3 inches; R=4.5 inches. The mean free path for absorption of the re-emitted light 15a, 15b is 1 inch. Calculated from the above equations, as a function of the displacement X, the difference in signals for the two optical sensors 16a, 16b is:

| X | 0 | 1.00 | 2.00 | 3.00 | → ∞ |
|---|---|------|------|------|-----|
| Δ | 0 | −0.72 | −0.95 | −0.99 | → −1 |

These differences are sufficient for tracking.

This embodiment is not limited to the dimensions of the example presented above, or to the use of two optical sensors. A tracking telescope requires a minimum of three sensors 16a, 16b, and generally four are used. However, a matrix of many small sensors, such as photodiodes or CCD arrays, may also serve as the sensors for this tracking telescope system.

Figure 2A:
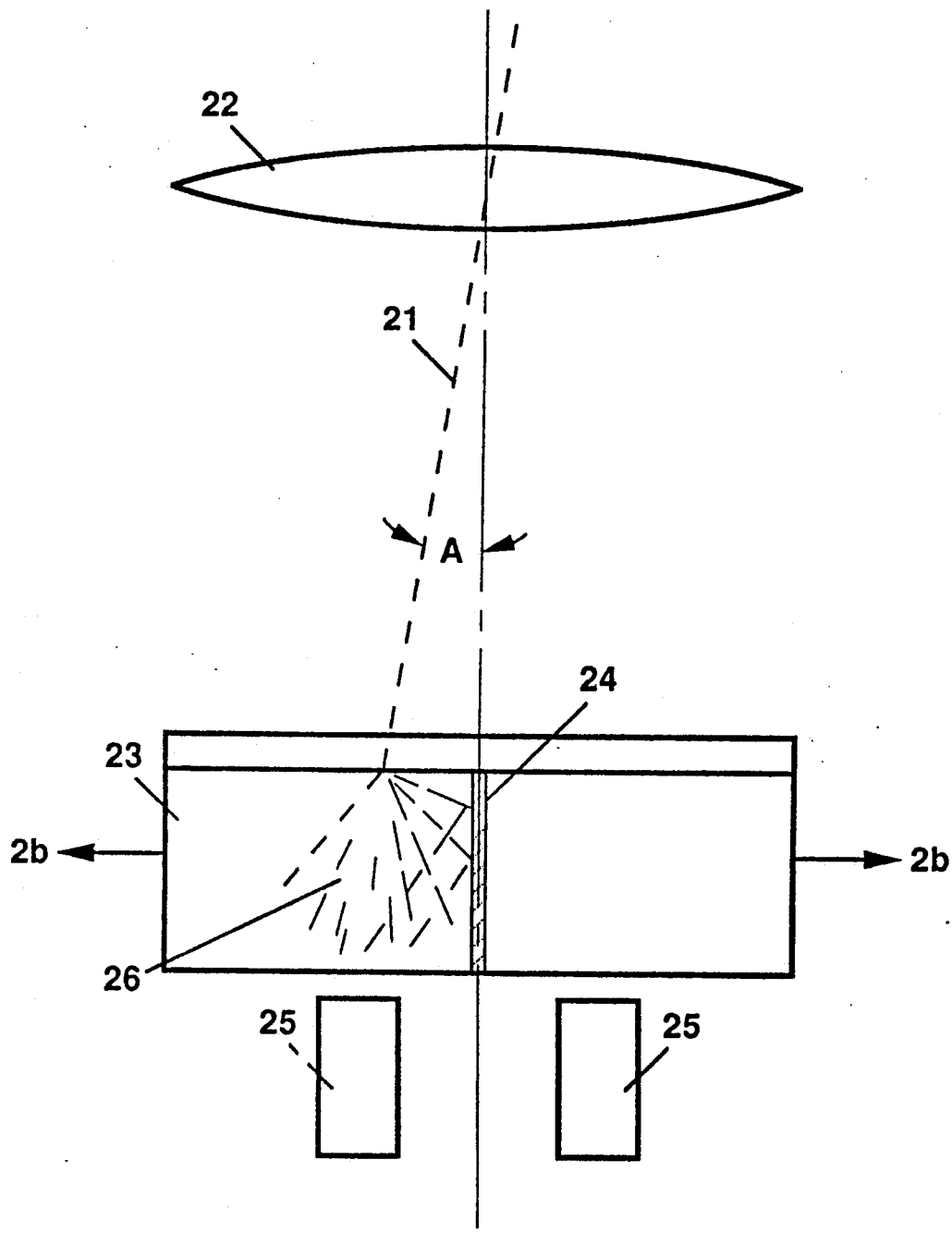
FIG. 2a is a schematic drawing of a second embodiment of an atomic resonance filter for use with a tracking telescope, according to the invention.
Figure 2B:
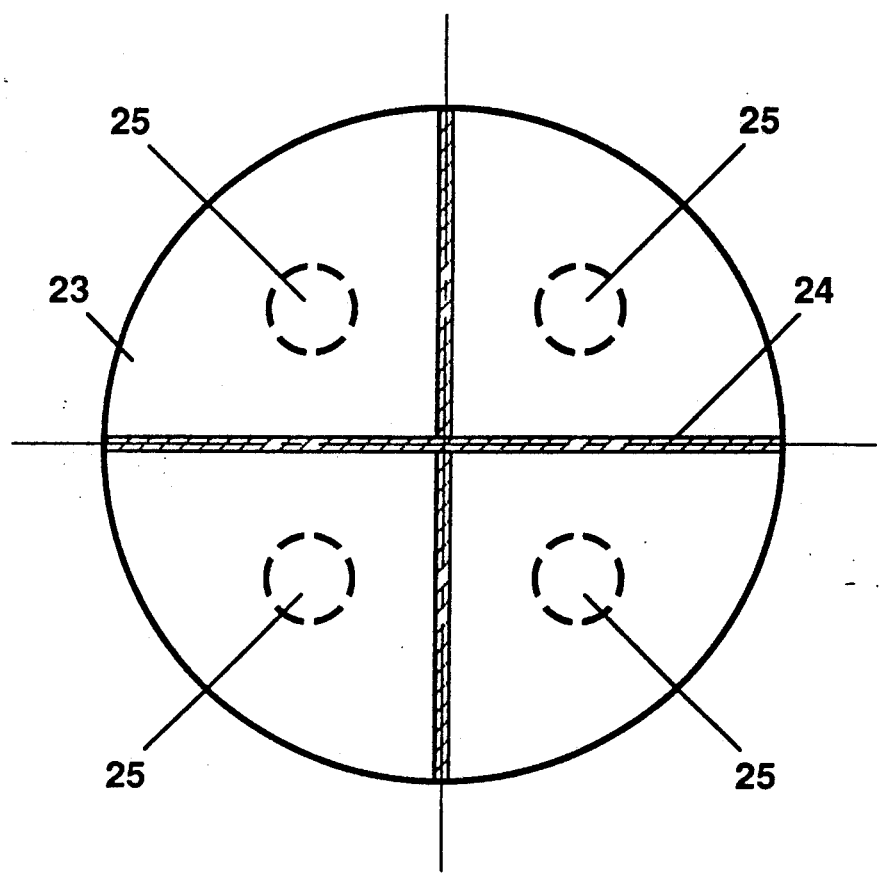
FIG. 2b is a cross-sectional view of the atomic resonance filter of FIG. 2a, taken along the line 2b—2b.

FIG. 2 illustrates a second embodiment of the present invention in which the optical tracking telescope system utilizes an atomic resonance filter having a vapor cell which is optically partitioned into quadrants, each quadrant having its own set of optical sensors. In the design of FIG. 2, incoming light 21 at an incident angle A passes through imaging optics 22, which can be any combination of lenses and mirrors positioned on the input side of an atomic resonance filter 23. The incoming light 21 is focused by imaging optics 22 into an atomic resonance filter 23, which is optically divided into quadrants by a partition 24, to provide differential tracking signals. Partition 24 extends most of the way to the top of atomic resonance filter 23, but leaves a small gap to allow for equalization in the distribution of the vapors used in atomic resonance filter 23. Partition 24 serves to confine re-emitted light to the quadrant in which it originated. Each quadrant of atomic resonance filter 23 has its own optical sensor 25 on its output side to detect the re-emitted light. As described above with respect to FIG. 1, the amount of re-emitted light collected in each quadrant will be proportional to angle of incidence A of incoming light 21. The difference of the electrical signals from the output of four sensors 25 is used to steer a telescope so that the light is equally distributed among the four quadrants, and hence point the telescope at the incoming light. The imaging optics 22 focuses the incoming light 21 in such a manner that when the telescope is pointing at the light source, and the angle of incidence A of the incoming light 21 is 0 (zero), equal portions of the incoming light will illuminate each of the four quadrants.

Figure 3:
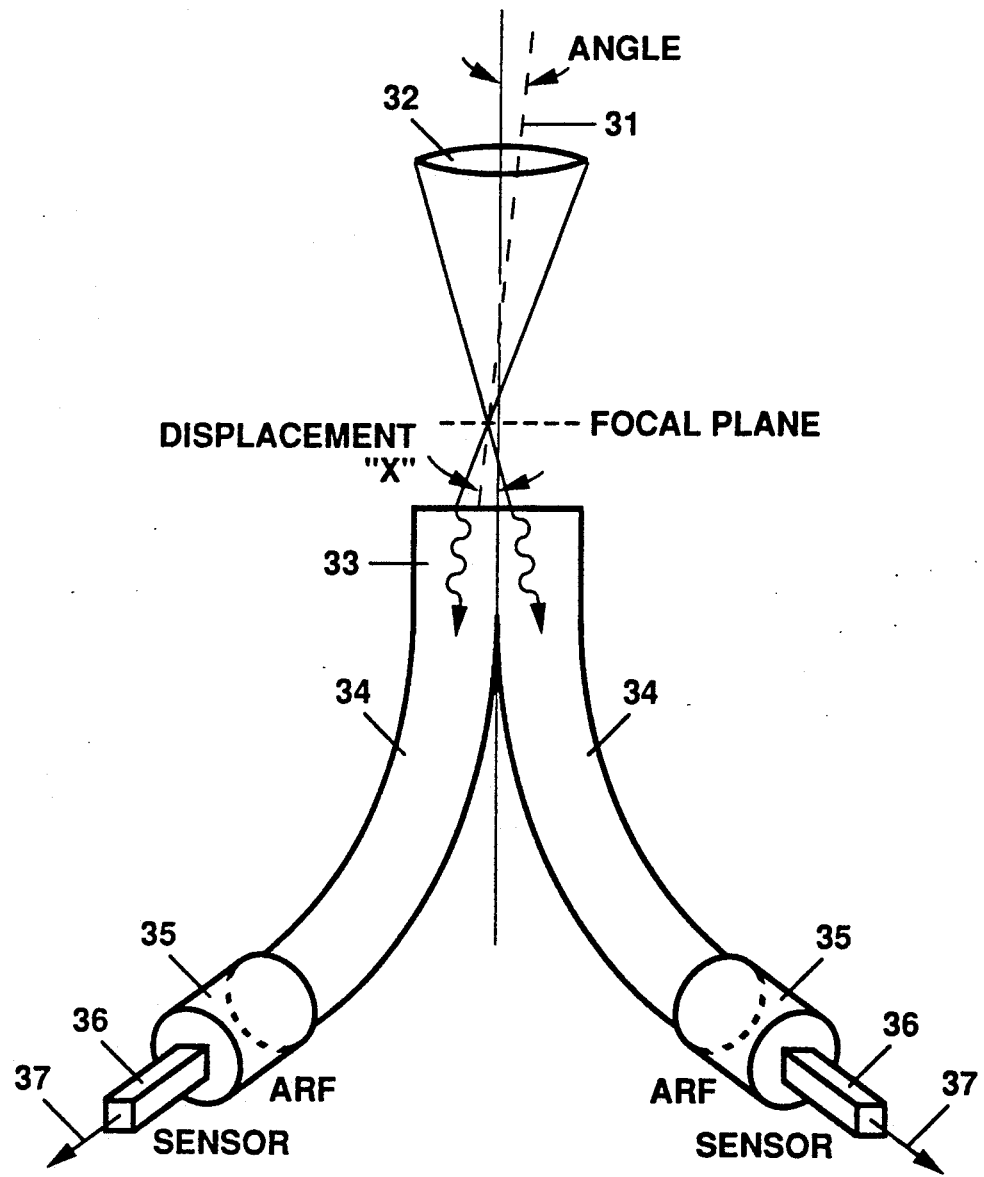
FIG. 3 is a schematic drawing of a third embodiment of an atomic resonance filter for use with a tracking telescope, according to the invention.

FIG. 3 illustrates a third embodiment of the present invention in which a tracking system for a tracking telescope utilizes a multi-segmented fiber-optic bundle, wherein each segment of the fiber-optic bundle transmits incoming light into its own atomic resonance filter. In FIG. 3, the incoming light 31 passes through imaging optics 32 at angle of incidence A and is focused by said imaging optics 32 on to a fiber-optic bundle 33 which is positioned near the focal plane of imaging optics 32. Fiber-optic bundle 33 is split into a plurality of sub-bundles 34, only two of which are shown, to provide differential optical signals. Each fiber-optic sub-bundle 34 is connected to the input side of an atomic resonance filter 35. An optical sensor 36 is positioned on the output side of each atomic resonance filter 35 to detect the re-admitted light. The output signals 37 from optical sensors 36 are used to track the incoming light.

In the embodiment of FIG. 3, the imaging optics 32 focuses the incoming light 31 slightly in front of the fiber-optic bundle 33 and consequently distributes the incoming light on fiber-optic bundle 33 such that the light signals in each of the sub-bundles 34 is proportional to the angle of incidence A of the incoming light 31. When the displacement X is not zero, more light is collected in one sub-bundle, and less in the others. The differences are detected to form error signals 37, which drive the telescope to zero the differences. These differential signals 37 are used to steer the telescope to point at the incoming light 31. When the angle of incidence A of the incoming light 31 is zero (0), the light signals in each of the sensors 36 are equal.

At least three fiber-optic bundles 33 are required to track the incoming light, and typically a tracking telescope would use four segments. According to this invention, various embodiments may include any number of sub-bundles and each filter 35 having a corresponding sensor 36.

We claim:

1. A tracking system to enable a tracking telescope follow a light source, comprising:
   an atomic resonance filter positioned in close proximity to said telescope;
   optical imaging means positioned between said light source and said atomic resonance filter, in close proximity to said atomic resonance filter;
   said atomic resonance filter positioned such that light signals from said light source passing through said optical imaging means toward said atomic resonance filter are focused in a region within said atomic resonance filter;
   a plurality of optical sensor means positioned after said atomic resonance filter to detect a plurality of re-emitted light signals from said atomic resonance filter, said optical sensor means being positioned to maximize said detected signals from said re-emitted light;
   said optical sensor means further including means to convert said detected re-emitted light signals to electrical signals proportional to the intensity of said re-emitted light signals from said region;
   means to reposition said telescope using the differences in electrical signals to equalize said re-emitted light signals detected by each of said optical sensors and thereby point said telescope directly at incoming light from said light source.

2. The system of claim 1 further comprising:
   partitioning means within said atomic resonance filter to optically partition said filter into quadrants; and
   said optical sensor means comprising at least one optical sensor per quadrant to detect re-emitted light signals from each of said quadrants.

3. A tracking system to enable a tracking telescope follow a light source, comprising:
   a fiber-optic bundle;
   optical imaging means positioned between said light source and said fiber-optic bundle, such that, said fiber-optic bundle is positioned near the focal plane of said optical imaging means to collect the focused light from said optical imaging means;
   said fiber-optic bundle being subdivided into a plurality of sub-bundles;
   one atomic resonance filter connected to each of said fiber-optic sub-bundles such that light signals from said light source passing through said optical imaging means and focused near said fiber-optic bundles are conveyed to each of said atomic resonance filters in proportion to the amount of light falling on said fiber-optic sub-bundles;
   at least one optical sensor means positioned after each of said atomic resonance filters to detect re-emitted light signals from said atomic resonance filters, each of said optical sensor means being positioned to maximize said detected signals from said re-emitted light;
   said optical sensor means further including means to convert said detected re-emitted light signals to electrical signals proportional to the intensity of said re-emitted light signals from said atomic resonance filters;
   means to reposition said telescope using said electrical signals to equalize said re-emitted light signals detected by said optical sensors, thereby pointing said telescope directly at incoming light from said light source.

* * * * *